July 25, 1967

L. E. HUMPHREY ET AL 3,333,050

ALKALI METAL ELECTRICAL CONDUCTORS WITH
REACTIVE POLYMER INSULATION
Filed Nov. 26, 1965

INVENTORS
LAURENCE E. HUMPHREY
GILBERT I. ADDIS
RAYMOND C. HESS

BY Robert C. Sullivan

ATTORNEY

United States Patent Office 3,333,050
Patented July 25, 1967

3,333,050
ALKALI METAL ELECTRICAL CONDUCTORS WITH REACTIVE POLYMER INSULATION
Laurence E. Humphrey, Westfield, Gilbert I. Addis, Plainfield, and Raymond C. Hess, Westfield, N.J., assignors to Union Carbide Corporation, a corporation of New York
Filed Nov. 26, 1965, Ser. No. 509,796
18 Claims. (Cl. 174—120)

ABSTRACT OF THE DISCLOSURE

Invention covers electrical conductors comprising an alkali metal conducting core, a layer of an inert olefin hydrocarbon polymer surrounding the core in intimate adhesive contact therewith and a second layer surrounding the inert olefin polymer being an electrical insulation composition normally reactive with the alkali metal.

Figure 1:
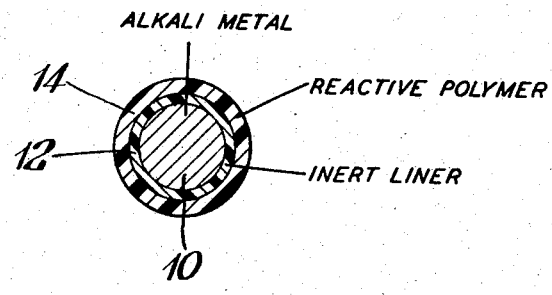

Particularly, sodium metal conductors having a firmly adhering protective layer of polyethylene, and as the primary insulation, a polymer or vulcanizable polymer composition that is normally reactive with sodium are provided by this invention.

---

This application is a continuation-in-part of copending application Ser. No. 485,485, filed Sept. 7, 1965, which is in turn a continuation-in-part of application Ser. No. 311,059, filed Sept. 24, 1963, now abandoned, which is a continuation-in-part of application Ser. No. 302,942, filed Aug. 19, 1963, now abandoned.

SPECIFICATION

The present invention relates to electrical conductors utilizing alkali metals as the conductor core element and insulating compositions which are highly reactive with said alkali metal core.

In copending applications Ser. No. 485,523, entitled, "Method of Preparing Electrical Conductor," and Ser. No. 485,485, entitled "Electrical Conductor," composite electrical conductors and a method for making same are disclosed wherein an alkali metal conducting core element is insulated with a specific class of inert thermoplastic polymers. These disclosed composite conductors have been found to overcome many of the problems and deficiencies of the prior art composite conductors such as the need for stranding of the core element, the need for conductor or "strand" shielding and inability to withstand abuse. Additionally these disclosed conductors provide many unexpected properties such as a high degree of flexibility, elongation and recovery characteristics, and excellent corona extinction values. Safety characteristics in manufacture, installation and use are surprising in view of the reactivity of the conducting core element.

However, as noted in the above-cited copending patent application the insulation material is limited to a specific class of inert polymers. There are certain polymers and polymeric compositions which are reactive with molten alkali metals and cannot therefore be used but which are otherwise desirable as insulating materials. Such polymers and compositions include fluoroethylene polymers, vinyl chloride polymers, acrylic acid polymers, natural and synthetic rubber compositions containing vulcanizing agents, as well as thermoplastic polymer compositions containing reactive cross-linking agents. The reactivity of such polymers and polymeric materials has excluded them from use in alkali metal conductors.

Now in accordance with the present invention an alkali metal composite conductor is provided which utilizes reactive polymers or polymeric compositions as the primary insulation. This is accomplished by providing a thin layer of an inert olefinic hydrocarbon polymer between the alkali metal and the reactive polymer composition. This inert layer is provided as part of a unitary composite annular insulation and as such functions as an insulation liner. The method disclosed herein by which such composite conductors are produced permits continuous production of the composite conductor in a single operation.

Figure 2:
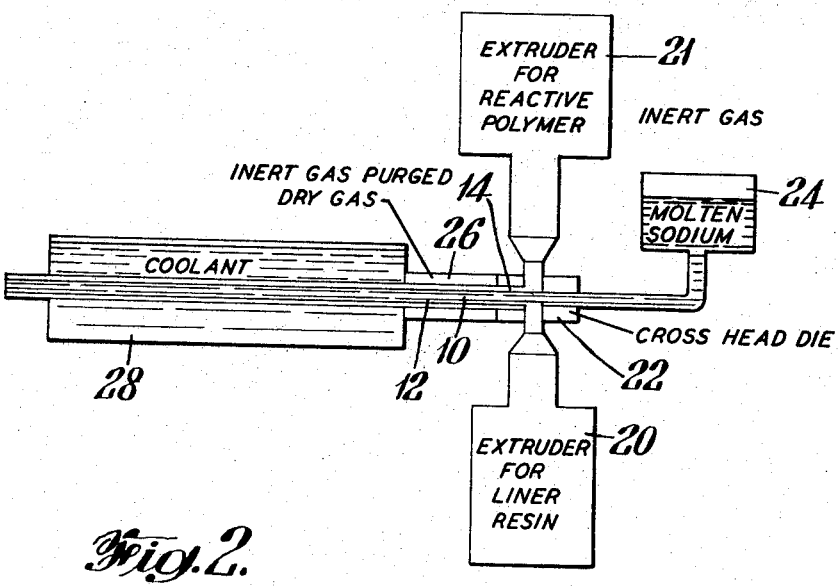

In the drawings:
FIG. 1 is a cross-sectional view of a composite conductor of this invention; and
FIG. 2 is a schematic representation of the preferred process of this invention.

The composite conductors of this invention provide substantially the same desirable properties as those disclosed in the above cited copending applications, for example, the present alkali conductors can be as flexible as the insulation material itself; these conductors are safe to handle and install; and can be produced at a fraction of the cost of similar composite conductors utilizing such conventional conductor metals as copper and aluminum. Additionally, however, the composite conductors of this invention utilize thermoplastic polymer compositions which are reactive to the alkali metal conductor thus providing a large class of materials for "use" heretofore not feasible or believed possible.

The alkali metals useful as electrical conductor metals in this invention are those having an atomic weight less than 40. Illustrative of such metals are lithium, sodium and potassium. Because of its ready availability, cost and properties, sodium is the preferred alkali metal for use in this invention. While such metals are known to be conductive in their fluid or molten state, the present invention is based in part on their use in a solid state. In the practice of our invention, we prefer to employ solid sodium as the conductive core of the composite electrical conductor. Preferred procedures for the production of the novel composite conductors provide for the use of molten metal in the fabrication thereof.

The inert polymers which are employed in the composite conductors of this invention as the insulation liner are, as indicated above, olefinic hydrocarbon polymers and are characterized by inertness to alkali metal and by a degree of water permeability of less than 3 and preferably less than 0.5 gram per 24 hours per 100 square inches of film per mil thickness. Desirable but not necessary characteristics of these inert polymers include a tensile strength of at least 800 and preferably at least 2000 and a flexural modulus of less than 200,000 and preferably less than 50,000 p.s.i. In high voltage applications the polymers may be additionally characterized by a dielectric strength greater than 450 volts per mil, and preferably greater than 500 volts per mil, as well as a dissipation factor less than 0.001 at 60 cycles, and preferably less than .0003 at 60 cycles, and a dielectric constant less than 3.0 and preferably less than 2.5.

Those polymers which are characterized by the above properties and therefore useful in the practice of our invention are produced as far as is known only by the polymerization of one or a mixture of mono-olefinic hydrocarbons containing from two to six carbon atoms. Typical of such polymers and copolymers are the low, medium and high density polyethylenes as well as the polypropylene, polybutene and ethylene-hexene copolymers and the like. Such copolymers useful in this invention should contain more than 50 percent polymerized ethylene and propylene or butane. They can however contain amounts less than 50 percent of other copolymerized hydrocarbon monomers such as pentene, hexene and the like. Of course mixtures of two or more of such polymers and copolymers in the form of blends can be employed. Best results to date have been obtained with a polyethylene having the above-referred to properties and having a density of from about 0.91 to about 0.96. Particularly preferred copolymers are the ethylene copolymers such as ethylene-propylene copolymers and ethylene-neo-hexene copolymers.

It will be appreciated that the specific hydrocarbon polymers employed as the liner for our composite electrical conductors can contain additives to modify the properties thereof without materially detracting from the inert and barrier characteristics thereof. For example, polar polymeric materials such as the ethylene-vinyl acetate of ethylene-ethyl acrylate copolymers can be blended with the hydrocarbon polymers referred to above to provide specific improvements in low temperature flexibility, impact resistance, stress cracking resistance and the like. For the most part such materials are added in an amount of up to about 4% by weight of the hydrocarbon polymer, although amounts of such additives up to about 35% by weight of the hydrocarbon polymer can be employed with good results. According to experience as the amounts of such additives progressively increase over and above about 15% by weight, they tend to proportionately detract from the desirable properties of our composite electrical conductor. Other additives such as pigments, stabilizers, anti-oxidants and the like can also be incorporated by blending within the specific hydrocarbon polymers referred to above without adversely effecting the insulating properties thereof or the electrical characteristics of the conductor. In general, these latter additives are incorporated in the hydrocarbon polymer in amounts consistent with their well-known usage in the conventional art. It should be noted, however, that such additives are preferably nonreactive with an alkali and do not substantially detract from the permeability of the polymer.

While the liner resin can be applied in any thickness suitable to provide protection to the reactive alkali metal core from the reactive insulation material, it has been found desirable to provide a liner having a thickness of at least 5 mils and preferably of at least 15 mils. The liner maximum thickness is determined by the size of the conductor, thickness of insulation, conductor properties desired and equipment available. Generally the liner is provided in a thickness less than 70 mils.

The materials which are used as the primary insulation materials in this invention are the polymeric thermoplasticplastic insulating materials normally reactive with molten alkali metals. Illustrative of such reactive polymeric materials are those polymers containing reactive functional groups such as labile halogen groups, carboxyl groups, hydroxy groups and the like such as polyfluoroethylene, polyacrylic acid, chloride and the like. Also illustrative of such reactive thermoplastic polymeric compositions are those compositions which are composed primarily of polymers which are usually nonreactive or inert in respect to the alkali metals, but in which the reactivity of such compositions to the alkali metal stems wholly or in part from additives to the compositions which are reactive or cause the compositions to be reactive. The nature of such additives is dependent to a certain extent on the polymer base used. For example, reactive sulfur containing vulcanizing agents are used in vulcanizable rubber compositions, reactive plasticizers are used in rigid vinyl type polymer compositions, crosslinking agents such as peroxides are used in olefin polymer compositions.

Reactive compositions which can be used as the insulation of the composite conductors of this invention are the thermoplastic, vulcanizable compositions and include both the natural rubber based compositions as well as the synthetic rubbers such as styrene-butadiene, ethylene/propylene/diene terpolymers, chloroprene polymers, and the like.

Reactive polymer compositions include the reactive thermoplastic crosslinkable olefin polymer compositions containing crosslinking agents. Such olefin polymer compositions are preferably based on olefin polymers produced by the polymerization of olefin monomers containing from two to three carbon atoms inclusive. Illustrative of such olefin polymers are the ethylene polymers as for example ethylene homopolymers such as low density polyethylene and ethylene-copolymers such as ethylene vinyl acetate copolymer, ethylene-propylene copolymer, ethylene-butene copolymer ethylene-neo-hexene copolymer and the like as well as the propylene polymer. Illustrative of the crosslinking agents which are used in such alkali metal reactive compositions are the inorganic and organic peroxides such as hydrogen peroxide, dicumyl peroxide, dibenzyl peroxide, di-tert-butyl peroxide and the like. Such curing agents are well known to the art.

In the conduct of this invention it is especially preferred to use crosslinkable polyethylene compositions utilizing di-α-cumyl peroxide as the crosslinking agent.

The reactive polymers provide many properties not provided by the inert polymers. Such properties include high temperature resistance, increased abrasion resistance, flexibility characteristics and the like. Such properties are usually determinative of the particular reactive polymer selected.

With particular reference to the drawings, the essential components of the composite electrical conductors are depicted in cross-sectional view in FIG. 1 and comprise a solid alkali metal core 10 encased in a relatively thin, continuous layer of flexible inert hydrocarbon polymer 12, which is immediately surrounded by a primary insulation of reactive polymer 14, such as peroxide containing vulcanizable polyethylene.

Such conductors can be easily produced in accordance with the present invention in varying sizes having practically any core diameter and insulation thickness desired. The preferred embodiment of the process of this invention is schematically depicted in FIG. 2. Referring to said figure and with continued reference to polyethylene and sodium as merely illustrative of useful liner hydrocarbon polymers and alkali metals which can be employed and peroxide containing vulcanizable polyethylene as the primary insulation polymer, molten polyethylene is fed from an extruder 20 through an inner annular orifice in a crosshead die 22, thereby forming extruded polyethylene tubing 12. Molten reactive thermoplastic polymer 14 is fed from the extruder 21 through an outer annular orifice in the cross-head die 22. As the two tubes are coaxially extruded simultaneously a laminate tubing is formed having an inner surface of polyethylene and an outer surface of peroxide containing vulcanizable polyethylene. Simultaneously with the extrusion of the laminate tubing 12/14 pressurized molten sodium metal is fed from a feed tank 24 blanketed with an inert gas, through a circular central orifice in the cross-head die 22, thereby forming a molten sodium rod or wire as it fills the extruded laminate tubing 12/14 and solidifies on cooling. Since the thermoplastic resins and the sodium are extruded simultaneously both the liner resin polyethylene and the sodium are in a molten state and the absence of air when they are brought together. As the system is hydraulically filled and continuously cooled shrinkage of the metal from cooling is compensated for. This method of filling and cooling is believed to be the reason that the conductor core is void-free.

The dimensions of the composite conductor provided by the simultaneous extrusion process of FIG. 2, i.e., the diameter of the sodium rod or wire 10 and the thickness of the polyethylene liner 12, and primary insulation 14 can be controlled by adjusting a number of interdependent variables. For any given cross-head die, the main variables are the temperature and feed rates of the molten resin, the temperature and pressure of the molten sodium, and the take-off speed or withdrawal rate of the composite conductor. In general, the diameter of the sodium wire 10 increases with increasing sodium pressures and with increasing sodium or resin temperatures. Similarly, the thickness of the inert liner 12 and the reactive polymeric insulation 14 decreases with any increase in the diameter of the sodium wire, and with increasing take-off speeds.

Thus it will be appreciated that, within limits, a variety of composite conductors can be made from a single extrusion die by merely modifying one or more process variables. The diameter and uniformity of the composite conductor may also be controlled by the use of sizing plates. Thus, all dimensions of the composite conductor as extruded can be readily controlled by adjusting one or more of the aforementioned variables.

From the cross-head die 22, the extruded composite conductor is passed through a dry box 26 which may be filled with an inert gas, such as nitrogen, which prevents the die from being cooled by the coolant and provides a measure of safety in the event that a break occurs in the composite insulation 12/14 upon extrusion thereof. The dry box can be provided with a transparent cover or window to permit observation of the extrusion operation.

From the dry box 26, the composite conductor is passed through a liquid cooling bath 28 to set the composite insulation 12/14 and solidify the sodium wire 10. The cooling liquid is preferably an oil or other liquid which is inert to both the sodium and the insulation. The use of oil as a coolant is a safety precaution in case a break occurs in the composite insulation 12/14. The temperature of the cooling bath can be adjusted to provide adequate cooling in accordance with the temperature of extrusion, the length of the bath, the size of the conductor, the take-off speed and the like. Of course, the cooling tank 28 may be replaced by any other suitable cooling means, such as air cooling or a cooling belt contoured to fit the conductor.

During start-up of the process illustrated in FIG. 2, the thermoplastic materials from the extruders are initially extruded without the molten sodium until the desired extrusion rate and other operating conditions have been established and stabilized. During the start-up period, the composite thermoplastic insulation 12/14 may be allowed to collapse as it emerges from the annular die orifice, thus forming a solid or nearly solid rod, or it may be maintained in the form of a tubing by feeding a pressurized gas through the central orifice of the die. After the desired conditions have been established, the flow of the molten sodium wire 10 within the inert composite insulation 12 is started. It is important that the molten sodium be continuously encased within the die 22 and the inert liner 12 during the extrusion operation, to achieve a firm bond between the conductor and insulation.

A unique characteristic of the composite electrical conductors of this invention is the extent to which the conducting element adheres to the interior surface of the inert thermoplastic liner. If the liner resin and primary insulation resin are selected for compatibility, a high degree of adhesion can be attained between the liner and primary insulation. For example the sodium core of a composite electrical conductor prepared by the process depicted in FIG. 2 cannot be pulled from or through the surrounding polyethylene liner. Similarly the most strenuous flexure or pulling fails to separate the primary insulation from the liner, when low density polyethylene is used as the liner and peroxide containing low density polyethylene is used as the primary insulation.

The reasons why the composite electrical conductor of this invention is characterized by the unique adhering relationship between the alkali metal core and the hydrocarbon polymer liner are not fully known or completely understood. Visual examination of the cross-sectional specimen of the composite conductor and corona tests showed that the interface between the alkali metal core and the hydrocarbon polymer liner was essentially free of voids. While this observation and test show that the outer surface of the alkali metal core and the inner surface of the polymer casing are in intimate and apparently continuous contact, it does not by itself fully explain or account for the unique characteristics, much less the remarkable properties of the novel composite conductors of this invention.

It will be appreciated that when a vulcanizable rubber composition or vulcanizable i.e. cross-linkable resin composition is utilized as the primary insulation, an additiontl vulcanizing step must be performed. Such treatments must be effected as will vulcanize or cross-link the outer layer of the polymer. In the case of peroxide containing polyethylene or sulfur containing rubber as exemplary, the extruded composite conductor must be subjected to heat to cross-link or vulcanize the insulation. This step is conducted at a temperature sufficiently high to effect such reaction. In the case of a polyethylene composition containing dicumyl peroxide heating the composite conductor at a temperature of about 190° C. for a period of from 10 to 30 minutes is usually sufficient to effect vulcanization without adversely affecting the cable.

When the primary insulation is merely reactive, as in the case of polyvinyl chloride or carboxylic acid containing polymers of course no post-treatment is usually necessary. The liner resin and primary insulation should be selected in respect to the particular use in which the conductor is to be employed. For example, if the conductor is to be utilized in high voltage applications then the selection of the primary insulating resin should be made in respect to the electrical characteristics. Further, the liner and primary insulation together should be selected in respect to compatibility and similarity of coefficients of expansion as the polymer layer should be adhering and void-free. When the conductor is to be utilized in relatively low voltage application, then the electrical properties of the polymeric materials and their compatibility is of less importance.

In the examples which follow and throughout this specification, unless otherwise indicated, properties are determined by the following tests and are measured in the indicated units.

Melt index (measured in decigrams per minute)—
  A.S.T.M. D–1238
Tensile strength (measured in pounds per square inch)—
  A.S.T.M. D–412
Flexural modulus (measured in pounds per square inch)
  —A.S.T.M. D–790
Moisture permeability (measured in grams per 24 hours per 100 square inches of film per mil thickness)—
  A.S.T.M. E–96–53T/Procedure E The following example serves to illustrate this invention and where possible sets forth a comparison with the prior art composite conductors and materials.

The resins employed in the examples which follow and their properties are as follows:

*Inert liner polymer—Resin A*

| | |
|---|---|
| Polymer | Polyethylene |
| Density | 0.92 |
| Melt index | 0.2 |
| Tensile strength | 2400 |
| Flexural modulus | [1] 43,000 |
| Moisture permeability | 1.4 |
| Commercial polymer stabilizer percent | 0.05–0.2 |

[1] At 0° C.

*Reactive primary insulation polymer—Resin B*

| | |
|---|---|
| Polymer | Polyethylene |
| Density | 0.92 |
| Melt index | ------ |
| Tensile strength | 2200 |
| Flexural modulus | [1] 18,000 |
| Moisture permeability | 1.4 |
| Reactive component | Dicumyl peroxide |
| Commercial polymer stabilizer percent | 0.1–0.5 |

[1] At 25° C.

These polymers are referred to by designation in the examples for convenience.

EXAMPLE

The apparatus represented in the schematic diagram in the drawing was utilized in this experiment. A three channel annular cross head die was mounted between, and to, two opposing extruders such that one extruder (21) fed the outer annulus of the die and the other extruder (20) fed the inner annulus of the die. A gravity-fed sodium reservoir was connected by insulated pipe to the central channel of the die. The liner extruder (20) was charged with Resin A and the insulator extruder (21) was charged with Resin B. Resin B was heated to an extrusion temperature of 165° C.; Resin A was heated to an extrusion temperature of 150° C. The metallic sodium was heated to provide a head temperature of 160° C. at a pressure of 27 inches of sodium. Resin A and Resin B were melt extruded simultaneously to produce a laminate tube. The sodium was then extruded through the central channel of the die so that it continuously filled the melt extrudate tube. The molten sodium was in immediate contact with the molten Resin A as the filled tube left the cross head. The sodium filled composite tube was cooled by passing through an oil bath at room temperature. The take-off speed was 3.5 feet per minute. This conductor was produced continuously by simultaneous extrusion until the desired amount of sodium conductor had been produced. Sample lengths of the conductor were cut and examined. The surfaces of the conductors were smooth having a good general appearance. An examination of freshly cut cross and length sections showed no voids, uniform structure and excellent adhesion of the sodium to the polyethylene liner (Resin A). Resin B was thermoplastic and had not vulcanized during extrusion.

In order to vulcanize the outer layer of Resin B the cable produced above is maintained in an oven at a temperature of 190° C. for a period of about ten minutes.

In a similar manner sodium conductor can be produced utilizing other thermoplastic materials which are reactive with sodium such as plasticized polyvinyl chloride vulcanizable rubber compositions and the like, by substituting them for Resin B above. Also other liner materials which are inert to sodium can be used such as polypropylene, poly-neo-hexene, ethylene-neohexene copolymer and the like merely by substituting these materials for Resin A above.

The cable produced in this example had the following dimensions:

| | Mils |
|---|---|
| Outside diameter | 460 |
| Sodium diameter | 290 |
| Resin A thickness | 15 |

What is claimed is:

1. An electrical conductor comprising a conducting element of an alkali metal continuously surrounded by and in intimate adhering contact with a layer of a normally solid hydrocarbon polymer of a mono-olefin containing from two to six carbon atoms, which polymer is inert to said alkali metal and said olefinic hydrocarbon polymer being continuously surrounded by a polymeric electrical insulating composition which is normally reactive to said alkali metal, said olefinic hydrocarbon polymer being further characterized by a water vapor permeability of less than 3 grams per 24 hours per hundred square inches of film per mil thickness.

2. The electrical conductor of claim 1 wherein the alkali metal is sodium.

3. The electrical conductor of claim 1 wherein the olefinic hydrocarbon polymer is polyethylene.

4. The electrical conductor of claim 3 wherein the polymeric electrical insulating composition is a vulcanized polymeric composition.

5. The electrical conductor of claim 3 wherein the inert thermoplastic olefinic hydrocarbon polymer has a wall thickness of at least 5 mils.

6. The electrical conductor of claim 1 wherein the polymeric electrical insulating composition is a vulcanizable polymer composition.

7. The electricial conductor of claim 1 wherein the polymeric electrical insulating composition is a peroxide containing ethylene polymer composition.

8. The electrical conductor of claim 1 wherein the polymeric electrical insulating composition is a vulcanizable rubber composition.

9. The electrical conductor of claim 1 wherein the polymeric electrical insulating composition is a polyvinyl chloride composition.

10. An electrical conductor comprising a conducting core of sodium metal continuously surrounded by and in intimate adhering contact with a polyethylene layer from 5 to 70 mils thick, said polyethylene layer being surrounded by a polymeric electrical insulating composition which is normally reactive to said alkali metal.

11. The electrical conductor of claim 10 wherein the polymeric electrical insulating composition is a vulcanizable polymeric composition.

12. The electrical conductor of claim 10 wherein the polymeric electrical insulating composition is a vulcanized polymeric composition.

13. The electrical conductor of claim 12 wherein the vulcanized polymeric composition is a vulcanized rubber.

14. The electrical conductor of claim 12 wherein the vulcanized polymeric composition is a vulcanized ethylene polymer composition.

15. The electrical conductor of claim 10 wherein the polymeric electrical insulating composition is a polyvinyl chloride composition.

16. The electrical conductor of claim 10 wherein the polymeric electrical insulating composition is a normally reactive olefin polymer of an olefin monomer containing from 2 to 3 carbon atoms inclusive.

17. The electrical conductor of claim 16 wherein the olefin polymer is crosslinked with a peroxide compound.

18. The electrical conductor of claim 17 wherein the peroxide compound is di-α-cumyl peroxide.

References Cited

UNITED STATES PATENTS

| 2,707,205 | 4/1955 | Abott et al. | |
|---|---|---|---|
| 2,712,384 | 7/1955 | Corneil. | |
| 3,230,299 | 1/1966 | Radziejowski | 174—127 X |

FOREIGN PATENTS

| 25,203 | 12/1901 | Switzerland. |
|---|---|---|
| 973,315 | 9/1950 | France. |

LARAMIE E. ASKIN, *Primary Examiner.*